United States Patent [19]

Bergler

[11] Patent Number: 4,531,441
[45] Date of Patent: Jul. 30, 1985

[54] COMBINATION TABLE AND MITER SAW

[75] Inventor: Otto Bergler, Muhlacker-Lomersheim, Fed. Rep. of Germany

[73] Assignee: Eugen Lutz GmbH & Co. Maschinenfabrik, Fed. Rep. of Germany

[21] Appl. No.: 621,125

[22] Filed: Jun. 14, 1984

Related U.S. Application Data

[63] Continuation of Ser. No. 347,245, Feb. 9, 1982.

[30] Foreign Application Priority Data

Feb. 19, 1981 [DE] Fed. Rep. of Germany ....... 3106098

[51] Int. Cl.$^3$ .......................... B27B 5/00; B27G 5/02
[52] U.S. Cl. ................... 83/471.3; 83/490; 83/477.2; 83/581
[58] Field of Search ............. 83/471.3, 490, 581, 83/477.2; 144/35.1

[56] References Cited

U.S. PATENT DOCUMENTS 2,851,068 9/1958 Goodlet .......................... 83/471.3
3,570,564 3/1971 Bergler .
3,994,192 11/1976 Faig ................................ 83/490

FOREIGN PATENT DOCUMENTS 1628992 11/1971 Fed. Rep. of Germany .
591212 8/1947 United Kingdom .

Primary Examiner—Donald R. Schran
Attorney, Agent, or Firm—Walter W. Burns, Jr.

[57] ABSTRACT

A combination table and miter saw is provided which has a slotted strip attached directly to a rotatable work supporting base plate. The slotted strip is part circular and forms a bearing connection for a saw assembly which accommodates pivoting of the saw assembly about an axis through a working surface of the bottom of the base plate. A threaded adjusting spindle for locking the saw in position during table sawing is connected to a bearing block which also is attached to the slotted strip.

9 Claims, 4 Drawing Figures

COMBINATION TABLE AND MITER SAW

This is a continuation, of application Ser. No. 347,245, filed Feb. 9, 1982.

BACKGROUND AND SUMMARY OF THE INVENTION

The invention relates to a combination table and miter saw with a round table mounted with a base plate, the whole rotatable through 180°, by means of lateral bearing pins said round table being provided with a slot and the base plate and round table having working surfaces on both sides, whereby a motor-driven saw assembly with a saw blade is pivotably mounted unilaterally on said base plate, said assembly being insertable into the slot for mitering and passable through the slot for table sawing, whereby a threaded spindle, adjustable lengthwise and engaging the saw assembly, is provided as a locking device for the saw assembly, said spindle being removable from at least one of its bearing points.

Combination table and miter saws of this general type are known (German Pat. No. 16 28 992, which is hereby incorporated by reference). These known designs are highly advantageous because of their versatility. The setting provisions known from miter saws of other types (German Pat. No. 21 33 308) or table saws (Austrian Pat. No. 25 79 04) which can be used to make bevel cuts as well, i.e., cuts which run at an angle to the surface supporting the workpiece cannot, however, be made with the known combination table and miter saws of the type described above, because the threaded spindle which is required in the table-saw position then abuts the base plate. Since maintaining accuracy when cutting bevels requires that the pivot axis for the saw assembly then run in the plate supporting the workpiece, the likewise necessary support by the threaded spindle cannot be maintained. Therefore, known designs of the combination table and miter saws described above do not make provision for pivoting about an axis which runs parallel to the slot in the base plate.

An object of the present invention is to design combination table and miter saws of the type described above in such fashion that the saw assembly can be pivoted relative to the plane which runs perpendicularly through the slot in the round table seated in the base plate without considerable manufacturing expense.

This object is achieved according to especially preferred embodiments of the invention by virtue of the fact that the pivot bearing for the saw assembly is mounted in a slotted guide which is made circular and runs perpendicular to the first pivot axis, the midpoint of said guide lying in the working plane of the round table seated in the base plate, and by the fact that the threaded spindle is mounted in a bearing block on the side away from the saw assembly, said block being designed as a part of the pivot bearing for the saw assembly. This design, wherein the threaded spindle is no longer mounted on the round table, permits the pivotable arrangement of the entire saw assembly in a slotted guide without difficulty. The new combination table and miter saw assembly therefore has the advantage that the bevel cuts are possible in addition to cross cuts and miter cuts and in addition to the possible uses of the table saw in both areas of application, which expands the range of application of the novel table and miter saw.

It is advantageous for the bearing block for the threaded spindle to be designed as a bearing fork, projecting rearward on the side of the first pivot axis which is opposite the saw blade. This bearing fork can be very simply formed in one piece with the part of the saw assembly which forms the pivot bearing.

In the novel preferred embodiment, it is important for all parts of the saw assembly, including the driver motor, to be designed so that the base plate, round table and saw assembly can be rotated through 180° about lateral bearing pins between miter saw and table saw positions even when the saw blade is set at an angle to the plane running vertically to the base plate through the slot. It has been found that this can be accomplished relatively simply if the diagonal setting of the saw assembly is given a maximum value of 45° to the plane perpendicular to the base plate. The slotted guide, which then covers an angle of 90°, can also be manufactured very simply.

These and other objects, features, and advantages of the present invention will become more apparent from the following description when taken in connection with the accompanying drawings which show, for the purposes of illustration only, a single embodiment in accordance with the present invention.

DETAILED DESCRIPTION OF THE DRAWINGS

Figure 1:
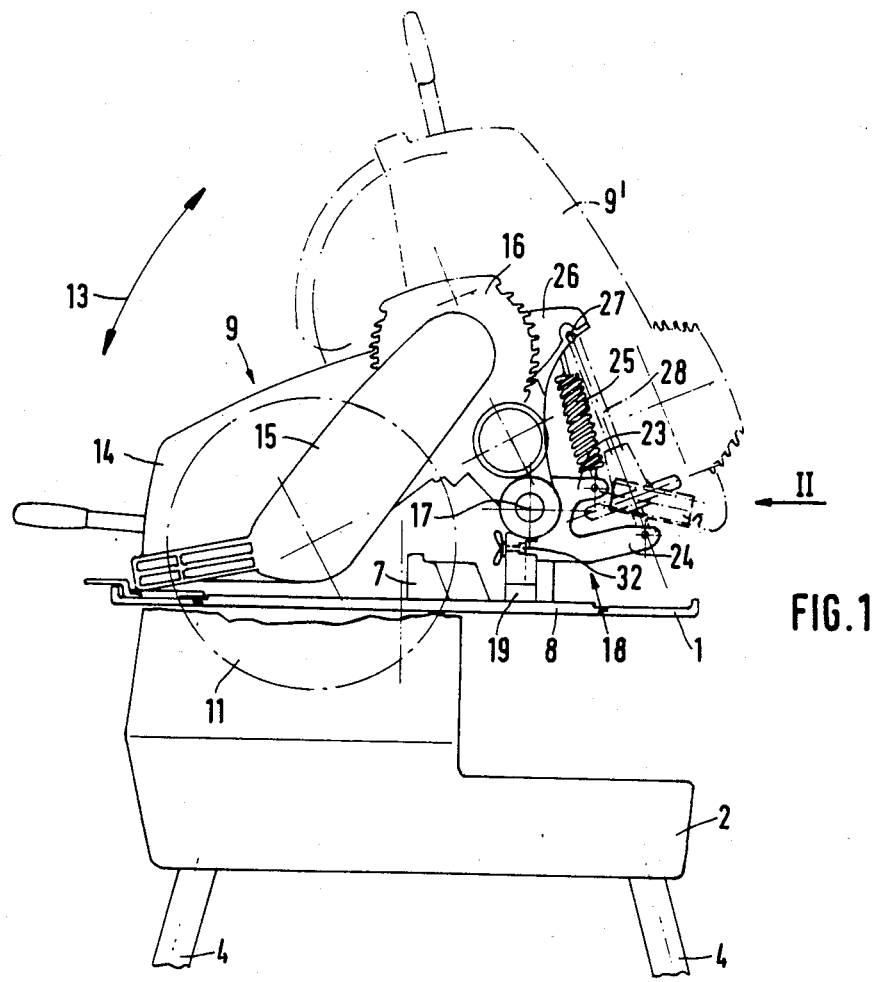
FIG. 1 is a schematic side elevation of the novel table and miter saw of the present invention shown in the position for sawing miters.
Figure 2:
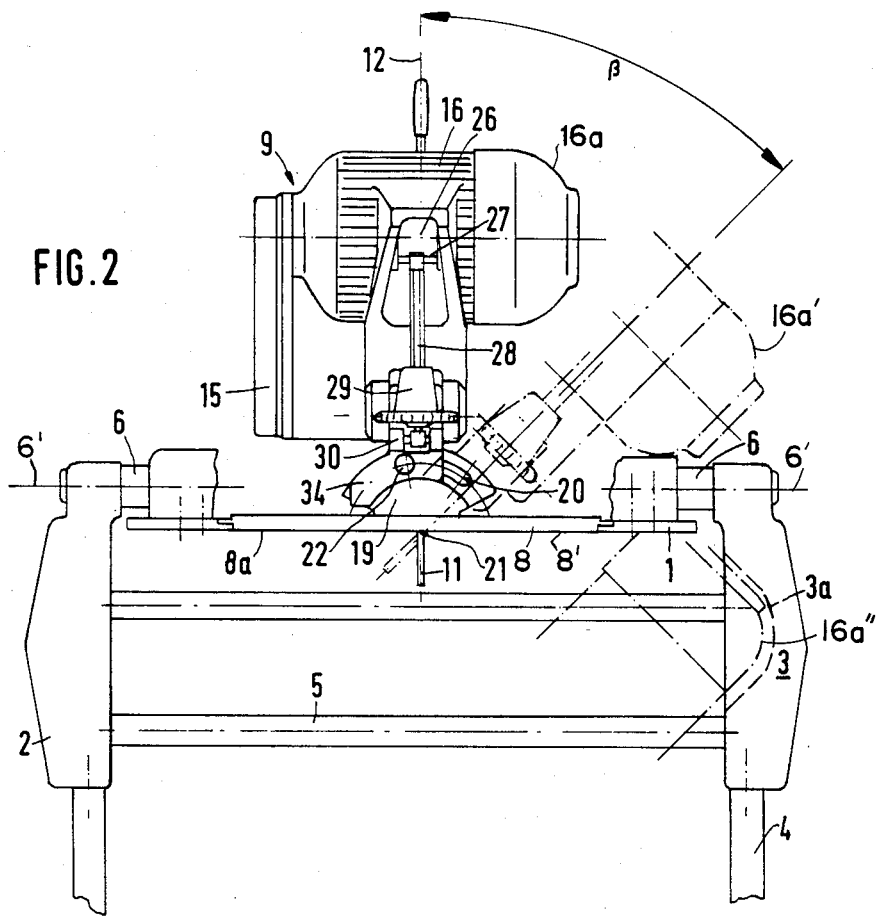
FIG. 2 is a view of the table and miter saw shown in FIG. 1, looking in the direction of arrow II.
Figure 3:
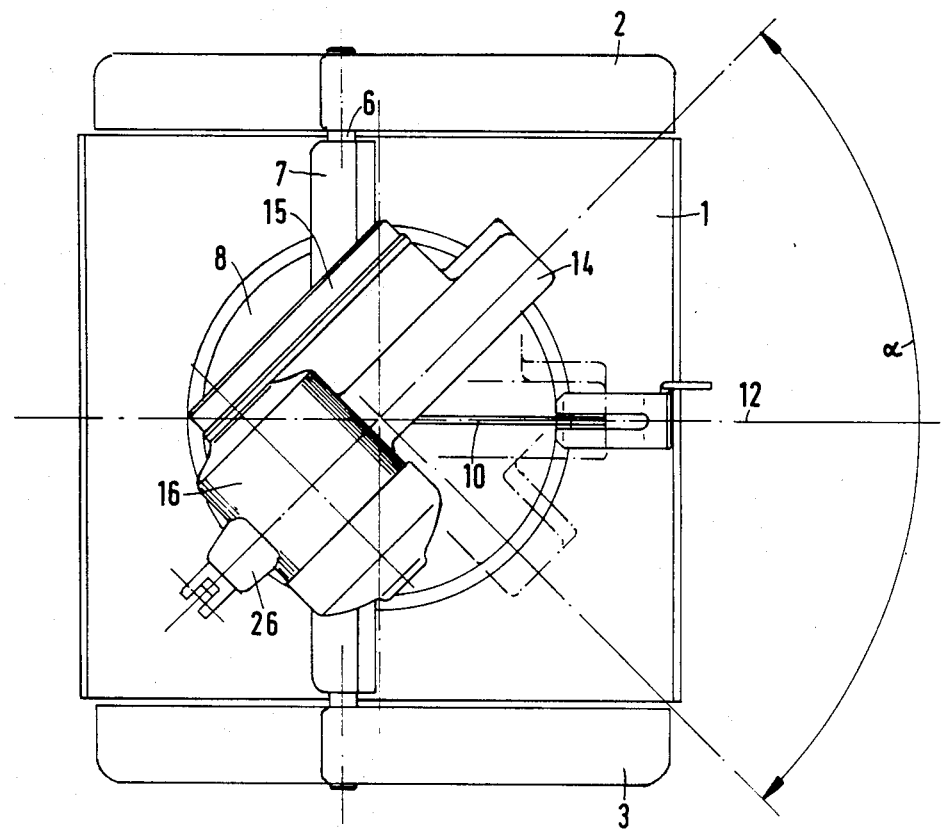
FIG. 3 is a top view of the saw shown in FIGS. 1 and 2.

FIGS. 1 to 3 show a base plate 1, serving as a workpiece table, pivotably mounted in two lateral support frame walls 2 and 3, extended downward by legs 4, so that base plate 1 can be brought to the level of a normal table plate. The two side walls 2 and 3 are connected together for stability by reinforcing rods 5. Base plate 1 is connected in known fashion by lateral bearing pins 6, having an axis 6', in side walls 2 and 3, which also support a stop strip 7, which runs transversely above base plate 1.

A round table 8 is rotatably mounted in base plate 1, upon which table the saw assembly 9 proper is mounted. As FIG. 3 shows, the cutting angle can be adjusted by virtue of the rotatability of round table 8 in a horizontal plane, i.e., in a plane parallel to base plate 1, through an angle α of 90°. Thus a 45° angle adjustment is possible, to either side, as shown in FIG. 3, beginning at a plane which runs vertically through the center of base plate 1 and therefore also through slot 10 for saw blade 11.

As FIG. 1 indicates, saw assembly 9 is disposed in a likewise previously contemplated fashion, pivotable in the direction of arrow 13, so that miter or cross cuts can be made beginning at the point 9' indicated by the dot-dashed line, while saw blade 11 is guided down from above onto the workpiece. The workpiece, not shown, is held in place by stop strip 7. For this purpose, saw blade 11 of the saw assembly, together with a guide 14 which covers the saw blade at the top and the drive belt drive, which is located beneath a cover 15, and the drive assembly 16, are mounted to pivot about shaft 17, which in turn forms part of a pivot bearing 18. Bearing 18 is permanently linked in a manner to be described in greater detail hereinbelow, with round table 8. Pivot bearing 18 in the embodiment shown in FIG. 4 consists of a slotted guide 19, permanently connected to round table 8, said pivot bearing 1B provided with an arcuate slot 20, visible in FIG. 2, said slot passing through an angle of 90° and having its midpoint on the intended axis 21 which corresponds to the cutting edge, shown in FIG. 2 between the lower workpiece support surface 8a of base plate 8 and the plane in which the saw blade is located. This position of the midpoint for the slotted guide 19, 20 is required when bevel cuts are to be made in the table-saw position. In the latter position surface B' of round table B is uppermost after rotation from miter position to provide a table.

Figure 4:
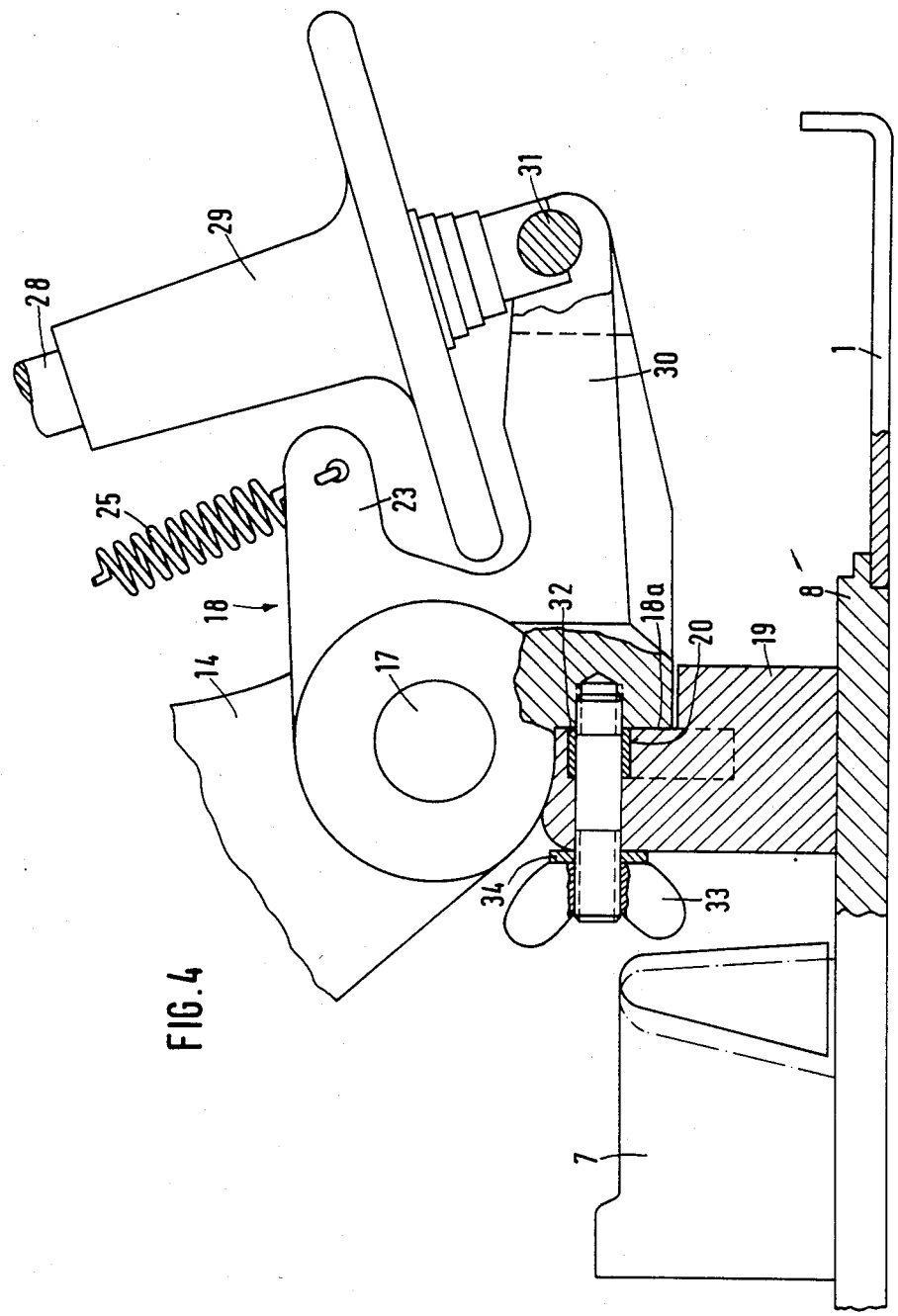
FIG. 4 shows a partially cut-away view, on an enlarged scale, of the slotted guide mounted on the base plate for the pivot bearing, with the bearing block for the threaded spindle mounted on the pivot bearing.

A slider 22 is guided in slot 20, said slider being mounted integrally with pivot bearing 18, said bearing also consisting of the two arms 23 and 24 which abut the side of pivot shaft 17 away from saw blade 11, upper arm 23 holding return spring 25 for saw assembly 9, pivotably mounted about shaft 17, said spring having its other end attached to the pivot arm 26 of saw housing 14, 15, 16. A bearing point 27 is also provided on this pivot arm 26 of the saw housing, into which point a pin, running transversely to a threaded spindle 28 (FIG. 2) is insertable when the saw is prepared for swiveling to the table saw position. FIG. 2 shows that threaded spindle 28 is provided at its lower end with a handwheel 29, used to adjust the length of threaded spindle 28. The threaded spindle itself has its lower end in a bearing block 30, made fork-shaped, and, as shown in FIG. 4, likewise receiving a cross pin of threaded spindle 28. Bearing block 24 as well as arm 23 and slider 32 of pivot bearing 18 are made integral. A clamp screw 33 passes through slot 20 in slotted guide 19, said screw being usable to produce a frictional connection between support surface 18a of the pivot bearing and the corresponding matching surface of slotted guide 19, so that the position of pivot bearing 18 relative to slotted guide 19 can be ensured by operating thumb screw 33. As FIG. 2 indicates, saw assembly 9 can be pivoted to one side through an angle $\beta$ of 45° motor 16 and 16a assuming a position 16a'. In the embodiment, pivoting in the other direction is prevented by the fact that pivot bearing 18 is equipped with a corresponding stop extension 34. Of course, it would also be possible in the opposite direction if provision were made for driving housing 15 and other parts of saw assembly 9 not to pivot so far outward that they would prevent rotation of base plate 1, round table 10 and saw assembly 9 through 180° between miter and table saw positions about axis 6' of bearing pins 6.

In the embodiment, pivoting through angle is possible in only one direction. This pivoting process through an angle $\beta$ of up to 45° is sufficient to make bevel cuts. Wall 3 is cut away on its inside in such fashion (see recess 3a - FIG. 2) that motor 16 and 16a', together with the base plate, can still continue pivoting about axis 6' of lateral bearing pins 6 through 180° downward in the extreme bevel position to a position 16a" within recess 3a.

Hence, the new design permits cutting angle settings at an angle $\beta$ running diagonally to place 12, which is perpendicular to the base plate and runs through slot 10, in addition to the previously known cutting angle adjustments through angle $\alpha$. Hence, in the chosen design, it is no longer necessary for the pivot axis of threaded spindle 28 to coincide with pivot axis 21 for saw blade 11, because the support for saw assembly 9 in the table-saw position is now provided directly on pivot bearing 18, which is pivotably mounted as a whole in slotted guide 19.

While we have shown and described a single embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

I claim:

1. Combination table and miter saw arrangement comprising
   a frame,
   a base plate,
   means for mounting the base plate for rotation with respect to the frame between a table saw position through a predetermined angle to a miter saw position and having a circular aperture therein,
   a rotatable round table seated in the aperture of the base plate and having a slot,
   a motor driven saw assembly with a saw blade, said saw assembly being pivotally mounted at the edge on one side of the round table with said blade being insertable into the slot for making mitering cuts and positioned within the slot for table sawing,
   means mounting the saw assembly for pivotal movement about a first pivot axis for making mitering and cross cuts,
   a block means included in the pivotal mounting of the saw assembly and being fixed to the round table,
   said block means comprising
   means for rotating the saw assembly about a second axis perpendicular with respect to said first axis,
   a threaded spindle interconnected between the saw assembly and the block means to serve as an adjustable locking device for the saw assembly.

2. An arrangement according to claim 1 wherein said round table has working surfaces at both sides, and wherein said midpoint of a slotted guide having a slot is at the working surface on the side of the base plate facing away from the saw assembly.

3. An arrangement according to claim 1, wherein said threaded spindle has a first end fixably connected to one of its bearing points and is removably mounted at the other of its bearing points.

4. An arrangement according to claim 1, wherein said base plate with respect to the base plate is rotatable through a predetermined angle of substantially 180°.

5. An arrangement according to claim 2, wherein the block means comprises a bearing fork, projecting rearward on the side of said second pivot axis coincident with the slot and lies in the working surface of the round table which is opposite the saw assembly.

6. An arrangement according to claim 5 wherein the bearing fork is made integral with the block means.

7. An arrangement according to claim 1 wherein all parts of the saw assembly, including the drive motor, are so designed and dimensioned that even when the saw blade is at an angle to the plane which runs vertically with respect to the round table through the slot, the round table can be rotated through a predetermined angle.

8. An arrangement according to claim 5, wherein the blade means comprises an arcuate slotted guide mounted to the round table, and means disposed in the arcuate slotted guide mounting the saw assembly for angularly positioning the saw assembly for bevel cuts.

9. An arrangement according to claim 2, wherein the slot of the arcuate slotted guide extends in one direction over an angle of at least 45° from the vertical plane which runs through the slot in the round table.

* * * * *